United States Patent
Rico Alvarino et al.

(10) Patent No.: US 11,129,195 B2
(45) Date of Patent: Sep. 21, 2021

(54) TECHNIQUES AND APPARATUSES FOR POSITIONING REFERENCE SIGNAL (PRS) MANAGEMENT

(71) Applicant: QUALCOMM Incorporated, San Diego, CA (US)

(72) Inventors: Alberto Rico Alvarino, San Diego, CA (US); Achaleshwar Sahai, San Jose, CA (US); Kapil Bhattad, Bangalore (IN); Sven Fischer, Nuremberg (DE); Mungal Singh Dhanda, Slough (GB); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/031,851

(22) Filed: Jul. 10, 2018

(65) Prior Publication Data

US 2019/0053280 A1 Feb. 14, 2019

(30) Foreign Application Priority Data

Aug. 9, 2017 (IN) .............................. 201741028320

(51) Int. Cl.
*H04W 4/00* (2018.01)
*H04W 74/08* (2009.01)
(Continued)

(52) U.S. Cl.
CPC ....... *H04W 74/0825* (2013.01); *H04L 5/0048* (2013.01); *H04W 64/003* (2013.01);
(Continued)

(58) Field of Classification Search
CPC ........... H04W 72/042; H04W 72/0446; H04W 76/27; H04W 74/0825; H04W 64/003;
(Continued)

(56) References Cited

U.S. PATENT DOCUMENTS

| | | | |
|---|---|---|---|
| 2011/0176440 A1* | 7/2011 | Frank | G01S 5/0215 370/252 |
| 2012/0252487 A1* | 10/2012 | Siomina | H04W 24/10 455/456.1 |

(Continued)

OTHER PUBLICATIONS

Ericsson: "Collision between PBCH and PRS for MTC", 3GPP Draft, R1-163351 36211 CR0227 (REL-13, F) Collision between PBCH and PRS for MTC, 3rd Generation Partnership Project (3GPP), Mobile Competence Centre, 650, Route Des Lucioles, F-06921 Sophia-An, vol. RAN WG1, No. Busan, Korea, Apr. 11-Apr. 15, 2016, Apr. 2, 2016 (Apr. 2, 2016), XP051080631, 4 Pages, Retrieved from the Internet: URL:http://www.3gpp.org/ftp/tsg ran/WG1 RL 1/TSGR1 84b/Docs/ [retrieved on Apr. 2, 2016].

(Continued)

*Primary Examiner* — Atique Ahmed
(74) *Attorney, Agent, or Firm* — Qualcomm Incorporated

(57) ABSTRACT

A user equipment (UE) may determine that a channel, such as a downlink channel or an uplink channel, and a positioning reference signal (PRS) occasion are scheduled for a common set of resources, such as a common frequency, a common time, and/or the like. This may result in the UE being unable to receive the PRS and/or process the PRS as a result of receiving the channel. In some aspects, the UE may determine that a PRS collides with a channel, and may perform a collision response action, such as dropping at least a portion of the channel, based at least in part on determining that the PRS occasion collides with the channel.

30 Claims, 11 Drawing Sheets

(51) Int. Cl.
  *H04W 64/00*   (2009.01)
  *H04L 5/00*   (2006.01)
  *H04W 4/70*   (2018.01)
(52) U.S. Cl.
  CPC ............ *H04L 5/001* (2013.01); *H04L 5/0051* (2013.01); *H04W 4/70* (2018.02)
(58) Field of Classification Search
  CPC ...... H04W 4/70; H04L 5/0048; H04L 5/0053; H04L 5/001; H04L 5/0051; H04L 1/1812
  See application file for complete search history.

(56) References Cited

U.S. PATENT DOCUMENTS

| | | | |
|---|---|---|---|
| 2013/0022019 A1* | 1/2013 | Han | H04L 5/0069 370/329 |
| 2013/0194931 A1* | 8/2013 | Lee | H04W 72/04 370/241 |
| 2013/0294391 A1* | 11/2013 | Guo | H04W 72/042 370/329 |
| 2014/0349677 A1* | 11/2014 | Xiao | H04W 4/02 455/456.1 |
| 2015/0029903 A1* | 1/2015 | Chen | H04L 1/189 370/277 |
| 2015/0195770 A1* | 7/2015 | Sun | H04J 1/08 370/330 |
| 2015/0365931 A1* | 12/2015 | Ng | H04L 1/1893 370/329 |
| 2016/0066176 A1* | 3/2016 | Zhang | H04W 8/205 370/329 |
| 2016/0219607 A1* | 7/2016 | You | H04L 5/0053 |
| 2016/0330011 A1* | 11/2016 | Lee | H04L 5/0066 |
| 2017/0374640 A1* | 12/2017 | Kim | G01S 5/0226 |
| 2018/0124787 A1* | 5/2018 | Wang | H04W 64/00 |
| 2018/0159664 A1* | 6/2018 | You | H04L 5/0069 |
| 2018/0367185 A1* | 12/2018 | Yi | H04B 1/7143 |

OTHER PUBLICATIONS

International Search Report and Written Opinion—PCT/US2018/041662—ISA/EPO—dated Oct. 8, 2018.
Nokia Alcatel Lucent Shanghai Bell: "WF on PRS PRB Indication in SIBI-BR", 3GPP Draft, R1-1703665, 3rd Generation Partnership Project (3GPP), Mobile Competence Centre, 650, Route Des Lucioles, F-06921 Sophia-Antipolis Cedex France vol. RAN WG1, No. Athens, Greece; Feb. 13-Feb. 17, 2017, Feb. 16, 2017 (Feb. 16, 2017), XP051236559, pp. 1-4, Retrieved from the Internet: URL:http://www.3gpp.org/ftp/tsg_ran/WG1_RL_1/TSGR188/Docs/[retrieved on Feb. 16, 2017].

* cited by examiner

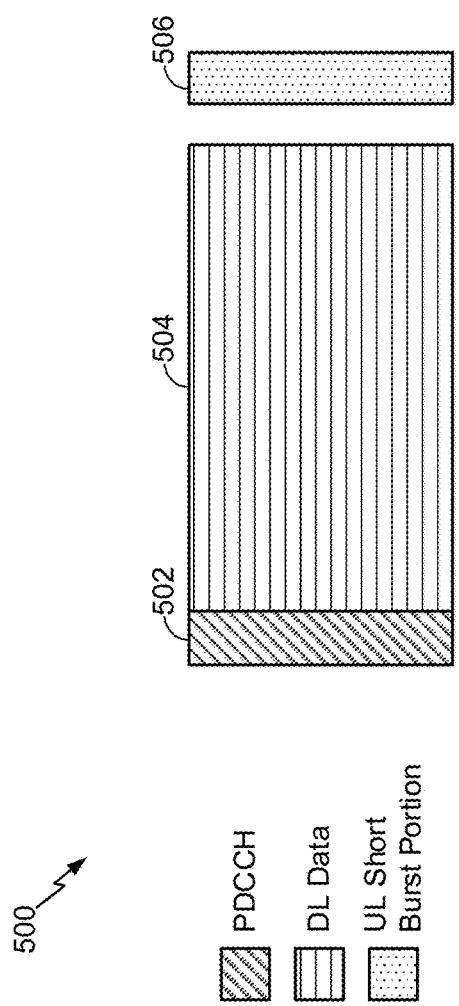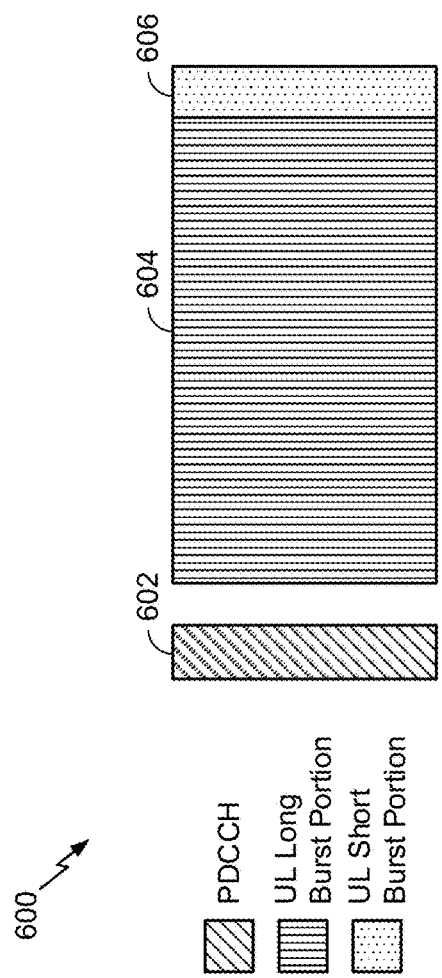

TECHNIQUES AND APPARATUSES FOR POSITIONING REFERENCE SIGNAL (PRS) MANAGEMENT

CROSS-REFERENCE TO RELATED APPLICATIONS UNDER 35 U.S.C. § 119

This application claims priority to Indian Provisional Patent Application No. 201741028320, filed on Aug. 9, 2017, entitled "TECHNIQUES AND APPARATUSES FOR POSITIONING REFERENCE SIGNAL (PRS) MANAGEMENT," which is hereby expressly incorporated by reference herein.

BACKGROUND

Field

Aspects of the present disclosure generally relate to wireless communication, and more particularly to techniques and apparatuses for positioning reference signal (PRS) management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR)/5G BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS and a UE may communicate in a wireless communication system. For example, the UE may receive a channel from the BS, such as a downlink shared channel, a downlink control channel, and/or the like. Additionally, or alternatively, the UE may provide communications to the UE via an uplink channel, such as an uplink shared channel, an uplink control channel, and/or the like. Periodically, the UE may receive a positioning reference signal (PRS) from the BS, and the UE may process the PRS to determine a location of the UE.

Some UEs may be associated with a threshold amount of processing resources, which may enable concurrent processing of uplink channels or downlink channels and one or more PRSs. However, other UEs, such as machine type communication (MTC) UEs, Internet of Things (IoT) UEs, and/or the like, may lack a threshold amount of processing resources. In this case, a UE may not be able to concurrently process one or more PRSs and a channel. Moreover, some UEs may lack processing resources to process the PRS during a period for the PRS, when a PRS periodicity is less than a threshold and a channel is received during the period for the PRS.

SUMMARY

Some aspects, described herein, provide a mechanism by which a UE may drop at least a portion of a channel when the channel collides with a PRS occasion. The PRS occasion may include PRS subframes, warm-up subframes immediately preceding the PRS subframes, and/or cool-down subframes immediately succeeding the PRS subframes. The UE may determine that at least a portion of a channel collides with the PRS occasion, such as colliding with the warm-up subframes, the PRS subframes, and/or the cool-down subframes, and may determine to drop at least a portion of the channel, an entirety of the channel, and/or the like. This may ensure that the UE can successfully receive the PRS and process the PRS.

In an aspect of the disclosure, a method, a user equipment, an apparatus, and a computer program product are provided.

In some aspects, the method may include determining, by a user equipment, that a positioning reference signal (PRS) occasion collides with a channel. The method may include performing, by the user equipment, a collision response action based at least in part on determining that the PRS occasion collides with the channel, wherein the collision response action includes dropping at least a portion of the channel.

In some aspects, the user equipment may include a memory and one or more processors coupled to the memory. The memory and the one or more processors may be configured to determine that a PRS occasion collides with a channel. The memory and the one or more processors may be configured to perform a collision response action based at least in part on determining that the PRS occasion collides with the channel, wherein the collision response action includes dropping at least a portion of the channel.

In some aspects, the apparatus may include means for determining that a PRS occasion collides with a channel. The apparatus may include means for performing a collision response action based at least in part on determining that the PRS occasion collides with the channel, wherein the collision response action includes dropping at least a portion of the channel.

In some aspects, the computer program product may include a non-transitory computer-readable medium storing one or more instructions for wireless communication that, when executed by one or more processors of a user equipment, cause the one or more processors to determine that a PRS occasion collides with a channel. The one or more instructions may cause the one or more processors to perform a collision response action based at least in part on determining that the PRS occasion collides with the channel, wherein the collision response action includes dropping at least a portion of the channel.

Aspects generally include a method, apparatus, system, computer program product, non-transitory computer-readable medium, user equipment, base station, wireless communication device, access point, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 5 is a diagram illustrating an example of a downlink (DL)-centric wireless communication structure.

FIG. 6 is a diagram illustrating an example of an uplink (UL)-centric wireless communication structure.

DETAILED DESCRIPTION

Figure 1:
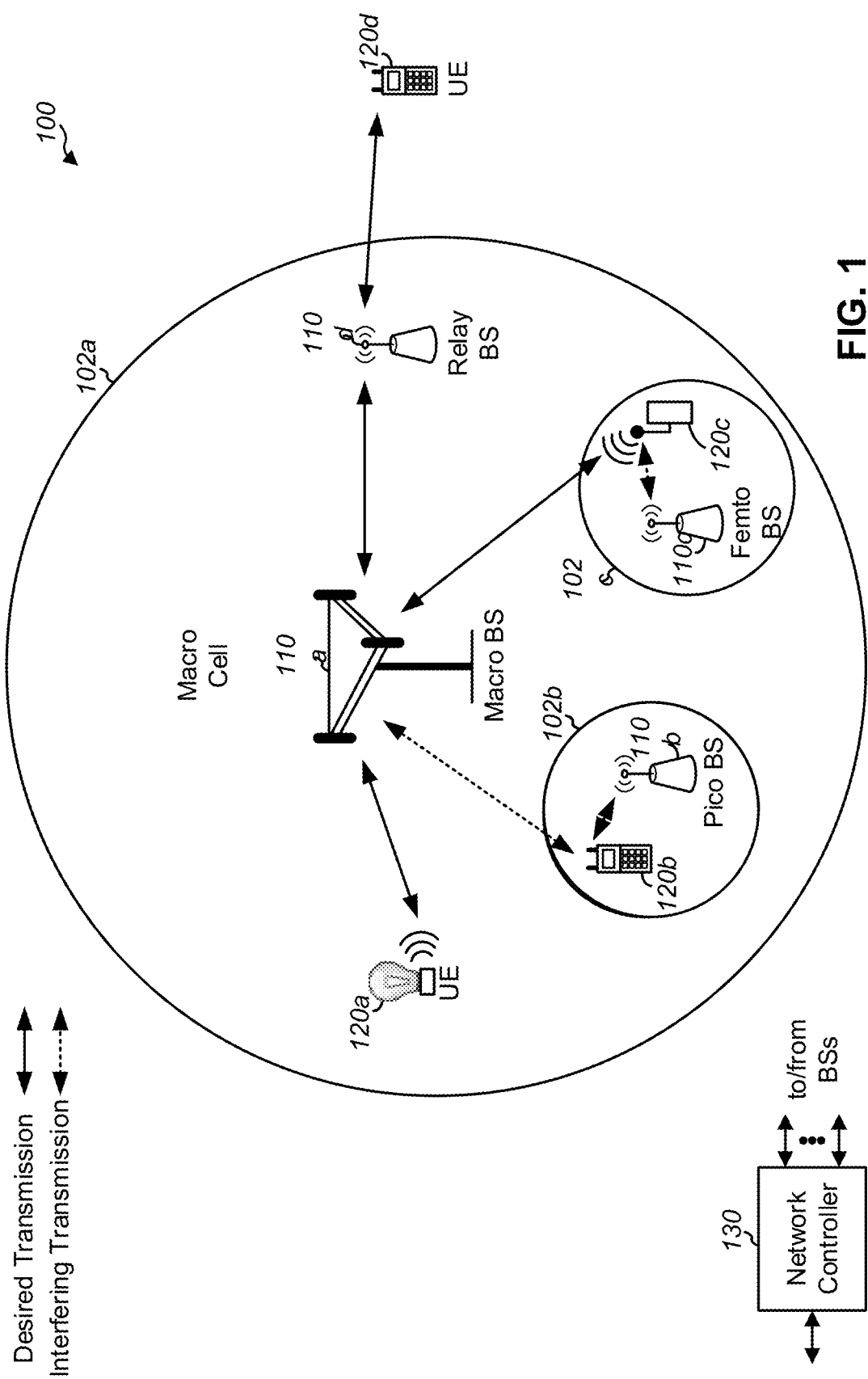
FIG. 1 is a diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another (e.g., directly or indirectly) via a wireless or wireline backhaul. In some aspects, network controller 130 may communicate with the BSs to identify a resource allocation for a channel of a cell. For example, network controller 130 may determine that the channel is to be transmitted by a first BS using a particular set of time resources, a particular set of frequency resources, and/or the like. In this case, UE 120 may be configured for receiving a PRS from a second BS at the particular set of time resources, the particular set of frequency resources, and/or the like. UE 120 may determine that a PRS occasion that includes the PRS collides with a portion of the channel, and may determine to drop the portion of the channel, the entirety of the channel, and/or the like to enable UE 120 to receive and/or process the PRS.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a smart home device (e.g., a smart appliance, a smart light bulb, such as UE 120a), or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In some aspects, UE 120 may determine that a positioning reference signal (PRS) occasion collides with a channel. In some aspects, UE 120 may perform a collision response action based at least in part on determining that the PRS occasion collides with the channel. For example, UE 120 may drop a portion of a channel, an entirety of a channel, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. For example, the scheduling entity may schedule transmission of a channel (e.g., an uplink channel or a downlink channel), a PRS occasion, and/or the like.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
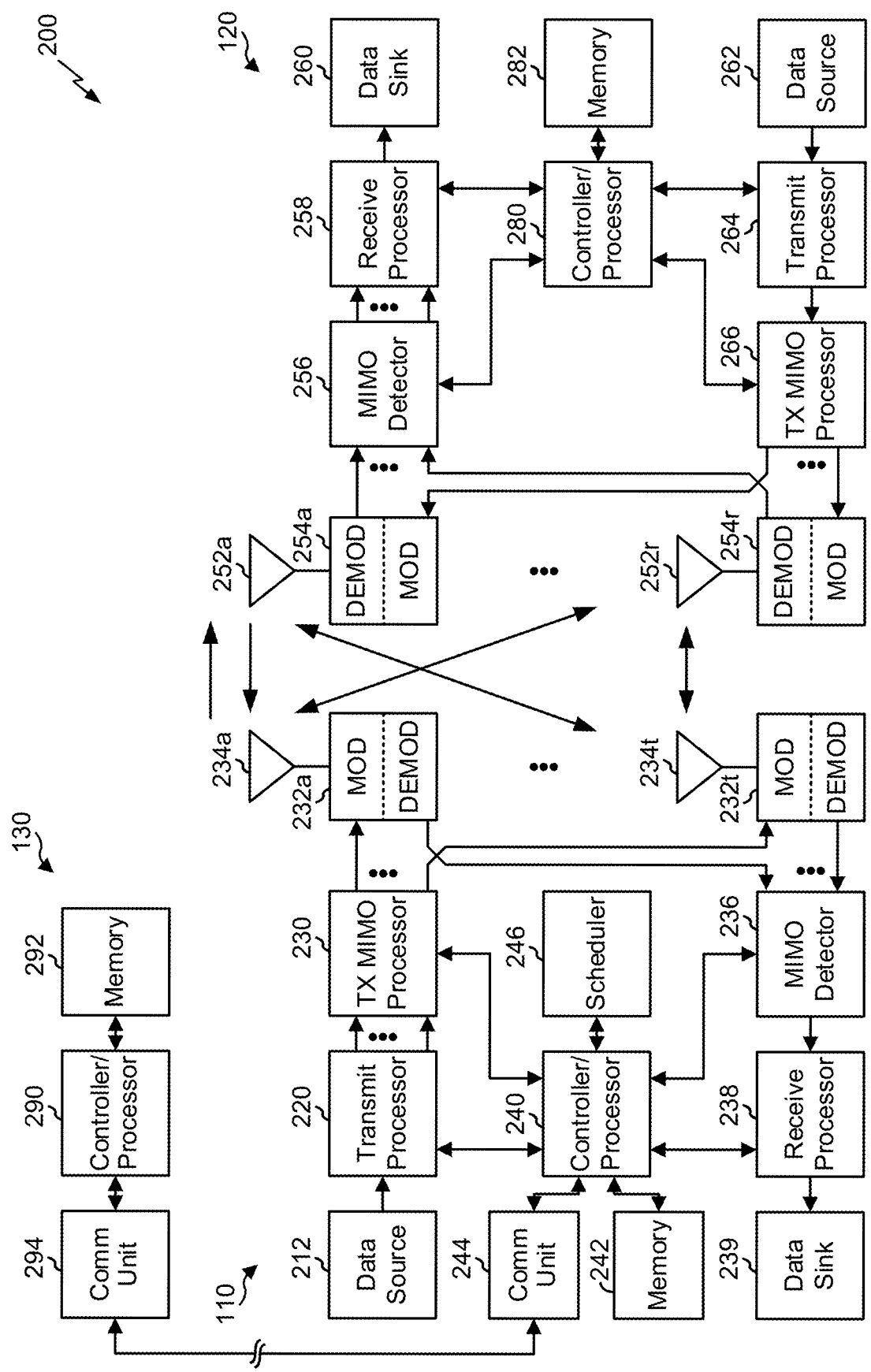
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for transmission to one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS, a PRS, and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. For example, UE 120 may receive downlink channels, PRSs, and/or the like. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with PRS management, as described in more detail elsewhere herein. For example, controller/processor 240 of base station 110, controller/processor 280 of UE 120, and/or any other component(s) of FIG. 2 may perform or direct operations of, for example, method 1000 of FIG. 10 and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
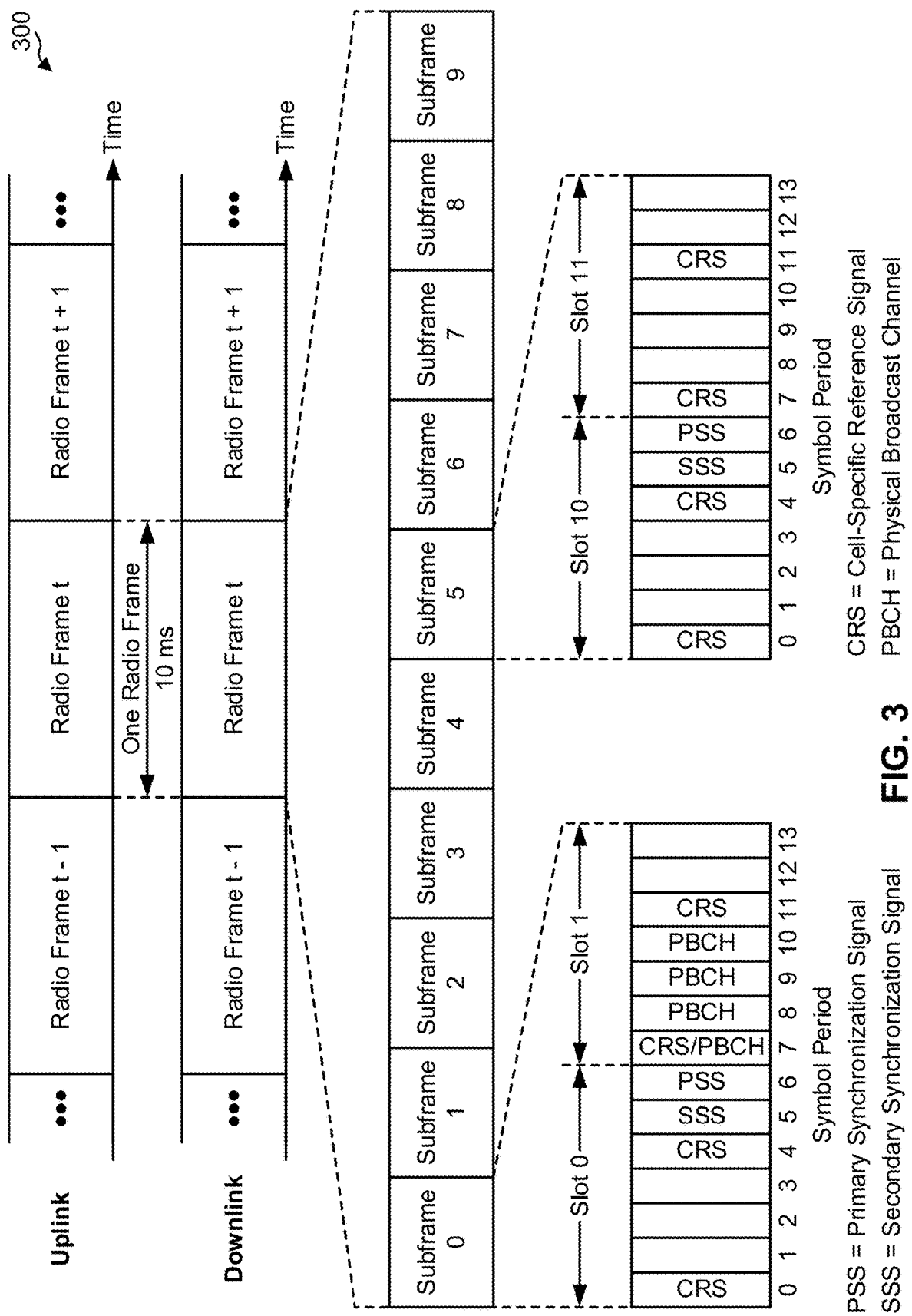
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a PRS for a UE. The PRS may be transmitted in a symbol period of a subframe and may be used by a UE to perform location determination. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
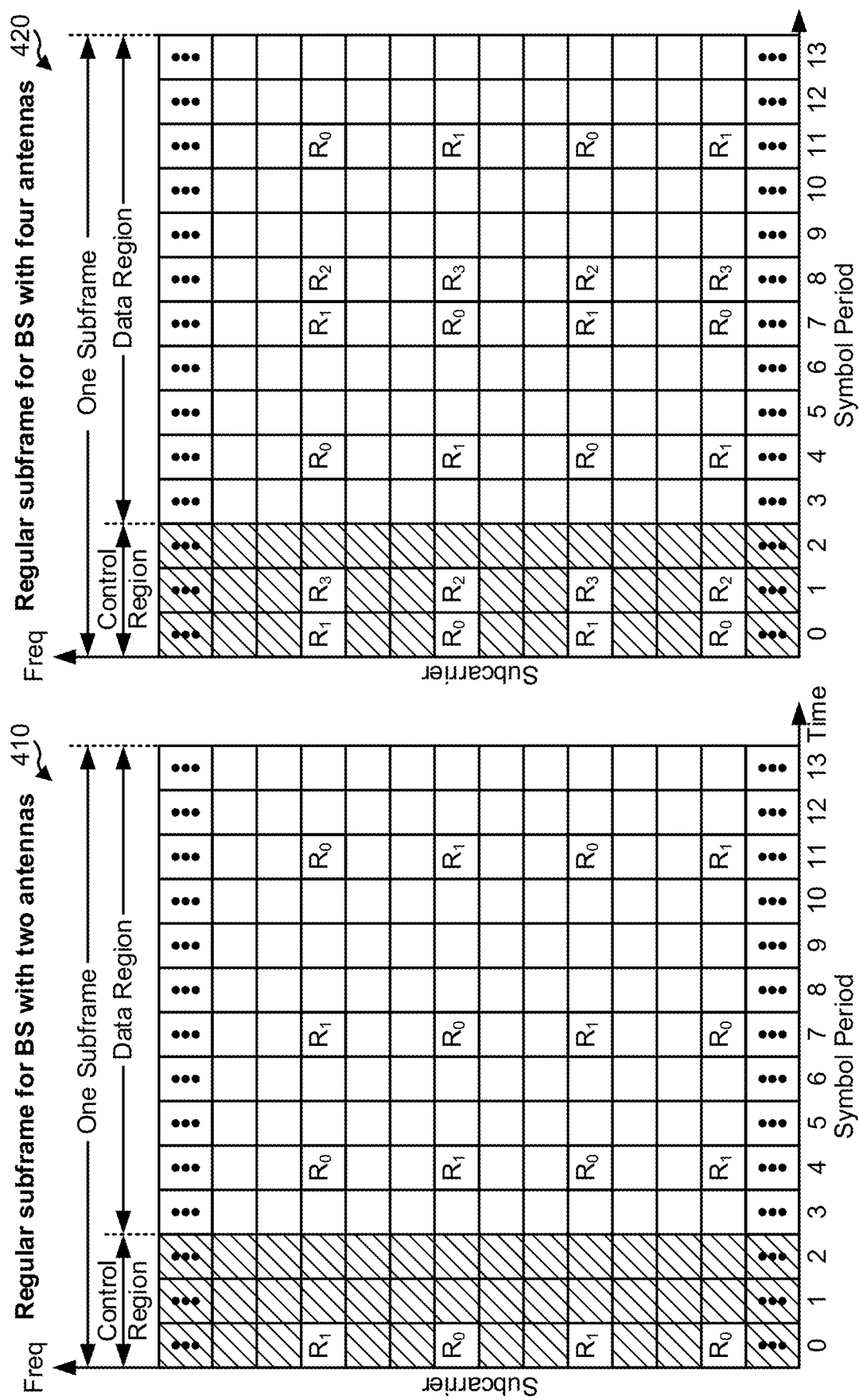
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric.

While aspects of the examples described herein may be associated with LTE technologies, aspects of the present disclosure may be applicable with other wireless communication systems, such as NR or 5G technologies.

New radio (NR) or 5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM)

on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

As indicated above, FIG. 4 is provided merely as an example. Other examples are possible and may differ from what was described with regard to FIG. 4.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some configurations, the control portion 502 may be a machine type communication (MTC) PDCCH (MPDCCH).

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH). In some configurations, DL data portion 504 may collide with subframes being used by a UE for a PRS. For example, an MPDCCH search space, a scheduled PDSCH, and/or the like may be scheduled for a same resource as a PRS occasion.

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. In some configurations, the control portion 602 may be a physical DL control channel (PDCCH).

The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. In some configurations, the UL-centric subframe may be utilized for a PUCCH or a PUSCH, and the PUCCH or the PUSCH may collide with a PRS occasion of a UE. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Figure 7:
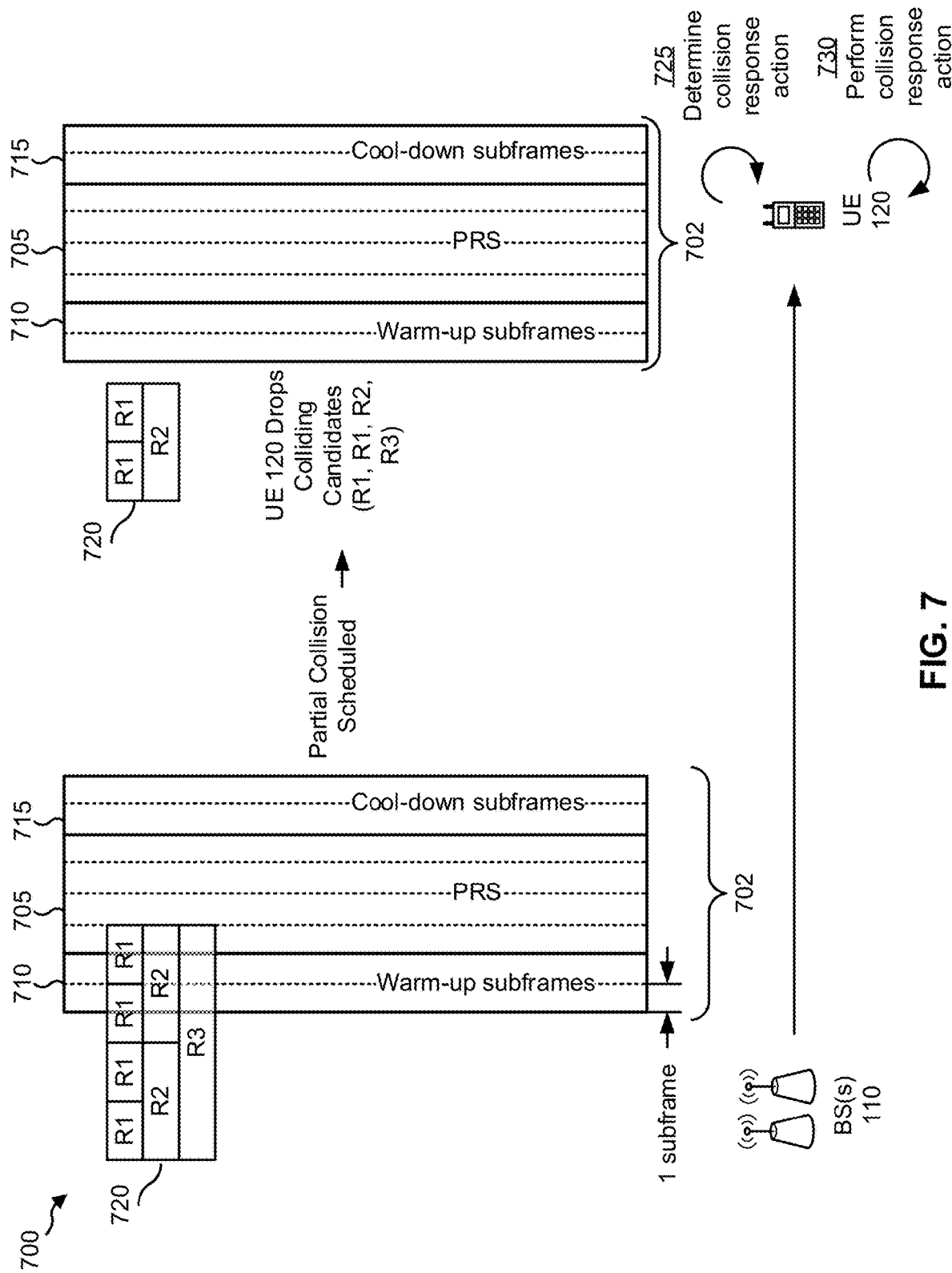
FIG. 7 is a diagram illustrating an example of performing positioning reference signal (PRS) management.

FIG. 7 is a diagram illustrating an example 700 of performing PRS management. As shown in FIG. 7, example 700 may include one or more BSs 110 and a UE 120. The BSs 110 may communicate with UE 120. The communication may include PRS occasion 702, which includes PRS subframes 705, warm-up subframes 710, and cool-down subframes 715, and may include candidates 720 (e.g., R1, R2, and R3) of a channel.

In some aspects, PRS subframes 705 includes one or more subframes allocated for a PRS. For example, PRS subframes 705 may include one or more subframes of a serving cell, one or more subframes of an inter-frequency cell, and/or the like. In some aspects, PRS subframes 705 include one or more muted subframes. For example, PRS subframes 705 may include one or more subframes used by a UE associated with a first cell of a first BS 110 for measuring a PRS from a second, neighbor cell of a second BS 110.

In some aspects, warm-up subframes 710 may include one or more subframes immediately preceding PRS subframes 705. In some aspects, cool-down subframes 715 may include one or more subframes immediately succeeding PRS subframes 705. Based at least in part on warm-up subframes 710 and/or cool-down subframes 715 being allocated for PRS occasion 702, a likelihood that a UE is unable to process PRS subframes 705 (e.g., as a result of having less than a threshold amount of processing resources) is reduced relative to PRS occasion 702 being limited to only PRS subframes 705. In other words, warm-up subframes 710 and cool-down subframes 715 increase a period of time during which a collision may be determined, thereby providing a guard period for PRS subframes 705 to enable UE 120 to prepare for PRS processing and to process PRS subframes 705, respectively.

At 725, UE 120 may determine that candidates 720 of a channel collide with PRS occasion 702, and may determine a collision response action. For example, UE 120 may receive scheduling information identifying a schedule for candidates 720 (e.g., R1, R2, and R3), and may determine a PRS occasion based at least in part on a PRS periodicity. In this case, a portion of the candidates R1 and the candidates R2 collides with PRS occasion 702. Similarly, the candidate R3 collides with PRS occasion 702. In some aspects, the channel may be a machine type communication control channel (e.g., an MPDCCH), a downlink shared channel (e.g., a PDSCH), a physical channel (e.g., a PDSCH or a PDCCH), an uplink channel (e.g., a PUCCH or a PUSCH), and/or the like.

In some aspects, UE 120 may determine a collision response action based at least in part on determining that at least a portion of the channel collides with PRS occasion 702. For example, UE 120 may determine a collision response action that includes dropping at least a portion of the channel. In some aspects, UE 120 may determine a collision response action based at least in part on a type of the channel. For example, for an MPDCCH, UE 120 may drop each candidate of the channel (e.g., each of the candidates R1, each of the candidates R2, and the candidate R3).

At 730, UE 120 may perform the collision response action. For example, for an MPDCCH, UE 120 may drop colliding candidates 720 of the channel as a collision response action. In this case, UE 120 may drop the portion of the candidates R1 and the candidates R2 that collides with PRS occasion 702, and the candidate R3 (which collides with PRS occasion 702). Further, UE 120 may receive another portion of the candidates R1 that do not collide with PRS occasion 702 and another portion of the candidates R2 that do not collide with PRS occasion 702.

In another example, UE 120 may determine and perform another collision response action. For example, for a PDSCH, UE 120 may drop an entirety of the PDSCH. Similarly, UE 120 may determine that a portion of the PDSCH is punctured, and may drop the portion of the PDSCH, as described herein with regard to FIG. 8. In some aspects, UE 120 may determine the collision response action based at least in part on a quantity of guard subframes. For example, for an uplink channel (e.g., a PUCCH or a PUSCH) colliding with PRS occasion 702, UE 120 may determine to drop a portion of the uplink channel colliding with the PRS occasion 702 and another portion associated with the quantity of guard subframes associated with transferring from downlink reception to uplink transmission in frequency division duplex (FDD) operation.

As indicated above, FIG. 7 is provided as an example. Other examples are possible and may differ from what was described with respect to FIG. 7.

Figure 8:
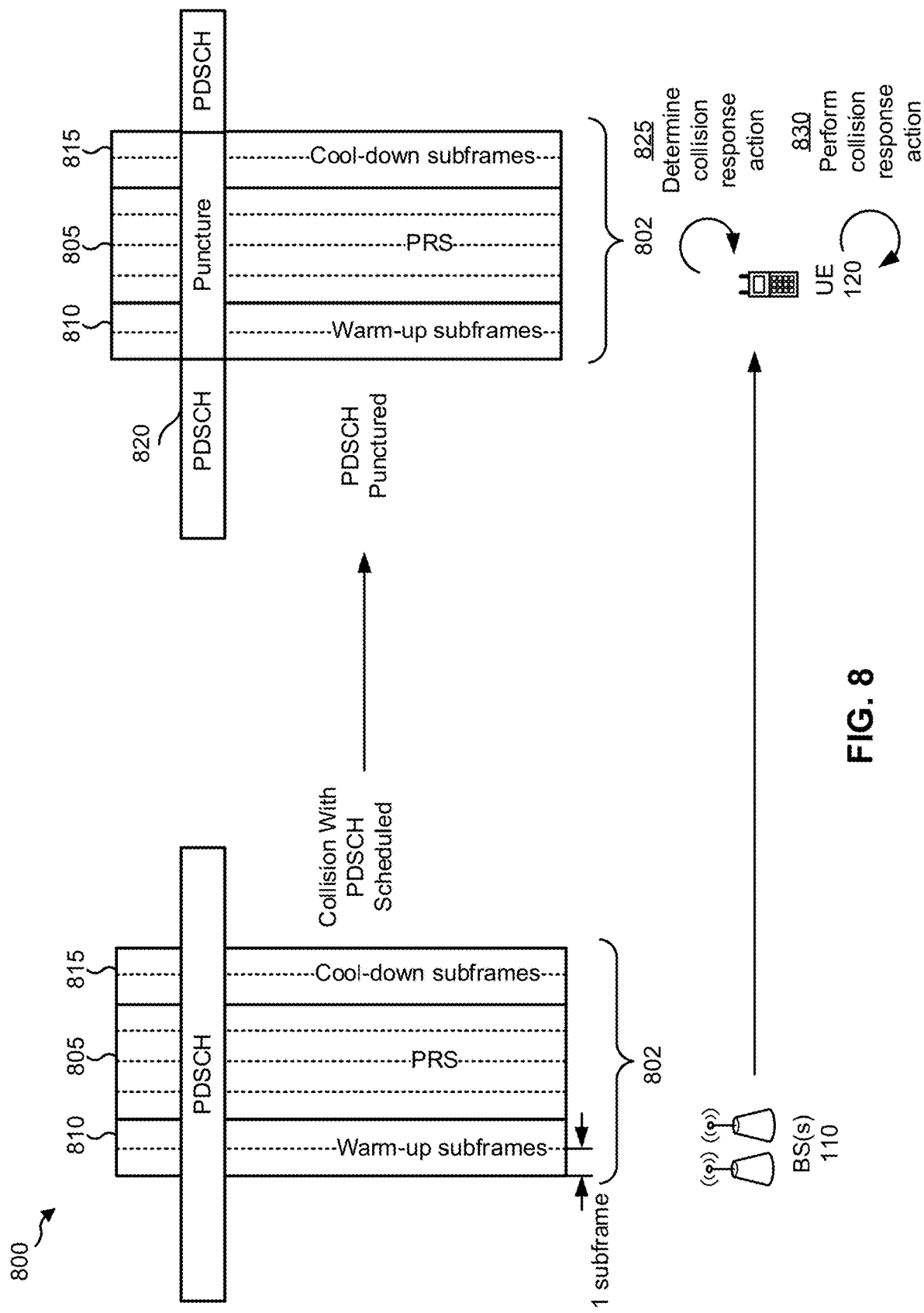
FIG. 8 is a diagram illustrating an example of performing PRS management.

FIG. 8 is a diagram illustrating an example 800 of performing PRS management. As shown in FIG. 8, example 800 may include one or more BSs 110 and a UE 120 in communication. The communication may include PRS occasion 802, which includes PRS subframes 805, warm-up subframes 810, and cool-down subframes 815, and the communication may include PDSCH 820. In some aspects, PRS subframes 805 may also include muted subframes (e.g. subframes in which PRS is not transmitted from a BS 110, but are used to measure PRS from another BS 110).

At 825, UE 120 may determine that PDSCH 820 collides with PRS occasion 802, and may determine a collision response action. For example, UE 120 may determine that PDSCH 820 is scheduled for a common time period as PRS occasion 802. In some aspects, a subset of repetitions of PDSCH 820 may collide with PRS occasion 802. For example, when a BS 110 transmits a plurality of repetitions of a group of bits of PDSCH 820, a first subset of the plurality of repetitions may collide with PRS occasion 802 and a second subset of the plurality of repetitions may not collide with PRS occasion 802. In some aspects, based at least in part on determining that PDSCH 820 collides with PRS occasion 802, UE 120 may determine to drop PDSCH 820 (e.g., the entirety of PDSCH 820). In some aspects, UE 120 may determine to drop a portion of the PDSCH 820. For example, UE 120 may classify PDSCH 820 as punctured.

At 830, UE 120 may perform the collision response action based at least in part on classifying PDSCH 820 as punctured. For example, UE 120 may determine, as a collision response action, to drop the second subset of the plurality of repetitions that collide with PRS occasion and may receive the first subset of the plurality of repetitions that do not collide with PRS occasion 802. In this case, UE 120 may attempt to decode PDSCH 820 using the first subset of the plurality of repetitions, thereby enabling UE 120 to receive PDSCH 820 and a PRS.

In some aspects, UE 120 may determine whether to drop an entirety of PDSCH 820 or a subset of repetitions of PDSCH 820 based at least in part on a quantity of repetitions for PDSCH 820. For example, when the quantity of repetitions for PDSCH 820 exceeds a first threshold, UE 120 may determine to classify PDSCH 820 as punctured. In some aspects, when the quantity of repetitions for PDSCH 820 exceeds a first threshold, and a quantity of the subset of repetitions of PDSCH 820 that collide with PRS occasion 802 does not exceed a second threshold, UE 120 may determine to classify PDSCH 820 as punctured. In some aspects, UE 120 may, if PDSCH 820 is repeated, puncture PDSCH 820. In this way, UE 120 reduces a likelihood that UE 120 attempts to receive PDSCH 820 but fails to decode PDSCH 820 as a result of receiving an insufficient quantity of repetitions.

As indicated above, FIG. 8 is provided as an example. Other examples are possible and may differ from what was described with respect to FIG. 8.

Figure 9:
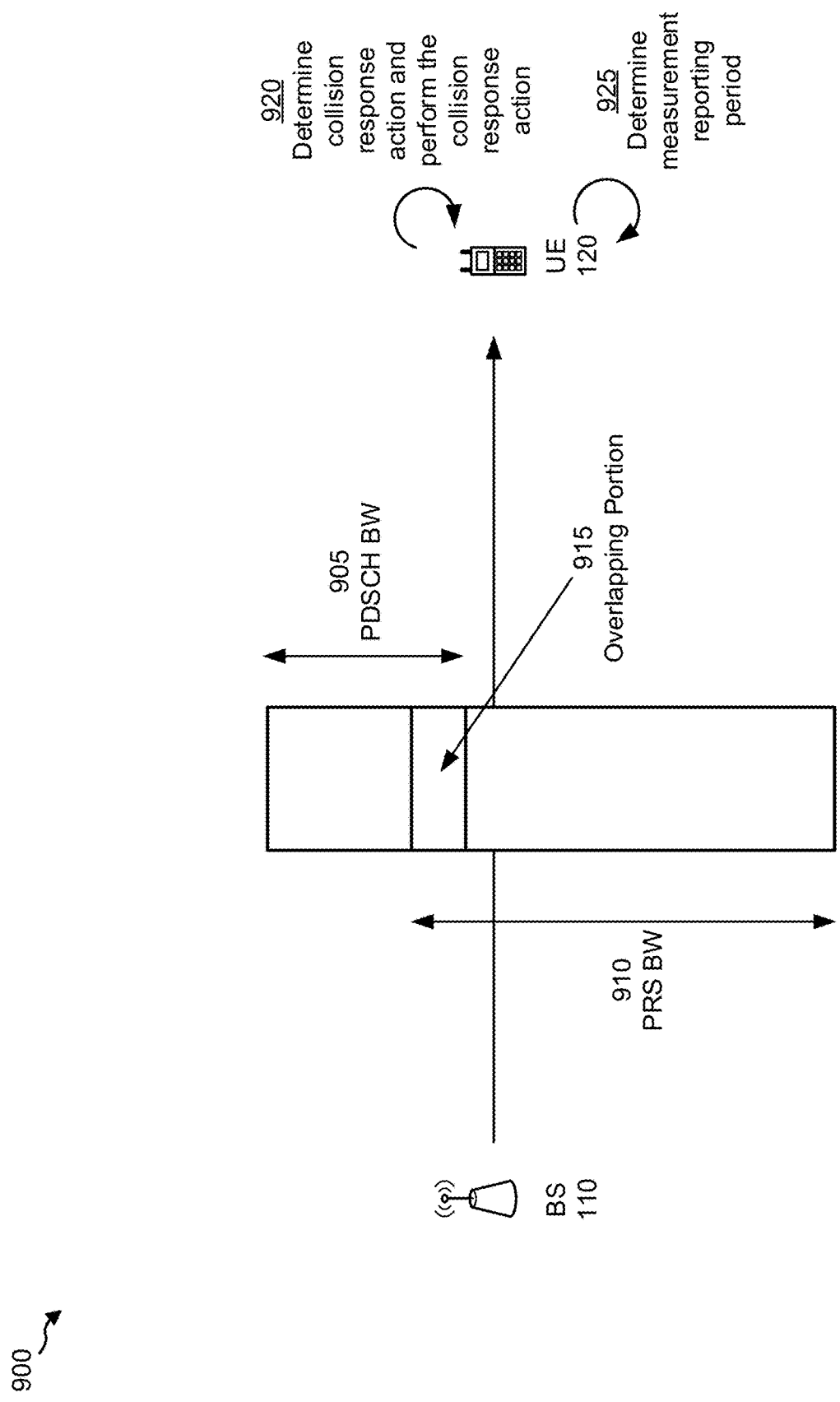
FIG. 9 is a diagram illustrating an example of performing PRS management.

FIG. 9 is a diagram illustrating an example 900 of performing PRS management. As shown in FIG. 9, example 900 includes a BS 110 and a UE 120 in communication. In some aspects, BS 110 may be associated with a serving cell of UE 120. The communication may include allocations for PDSCH bandwidth (BW) 905 and PRS bandwidth (BW) 910. PDSCH bandwidth 905 may overlap with PRS bandwidth 910 at overlapping portion 915. In some aspects, UE 120 may determine that PDSCH bandwidth 905 overlaps with PRS bandwidth 910 based at least in part on received information from BS 110. For example, based at least in part on received scheduling information identifying bandwidth allocations, UE 120 may determine that a PDSCH of PDSCH bandwidth 905 collides with a PRS of PRS bandwidth 910.

At 920, UE 120 may determine a collision response action and perform the collision response action based at least in part on determining that the PDSCH collides with the PRS. For example, UE 120 may determine to drop an entirety of the PDSCH included in PDSCH bandwidth 905. In some aspects, UE 120 may prioritize the PRS over the PDSCH by classifying the PDSCH as punctured. For example, UE 120 may prioritize tones or resource blocks of the PRS conveyed in overlapping portion 915 over tones or resource blocks of the PDSCH conveyed in overlapping portion 915. In this case, UE 120 may receive the PDSCH in portions of PDSCH bandwidth 905 that do not overlap with PRS bandwidth 910 enabling UE 120 to receive the PRS and the PDSCH. Additionally, or alternatively, UE 120 may drop MPDCCH candidates in overlapping portion 915, and may receive the PRS and the PDSCH in overlapping portion 915. In some aspects, UE 120 may prioritize receiving the PDSCH. For example, when the PDSCH is not associated with a plurality of repetitions, UE 120 may avoid dropping the PDSCH in overlapping portion 915 to ensure reception of the PDSCH. In this case, UE 120 may drop the PRS or a portion of the PRS.

At 925, UE 120 may determine a reporting period for a reference signal time difference (RSTD) measurement. For example, UE 120 may determine to report the RSTD measurement based at least in part on a PRS periodicity. In some aspects, UE 120 may determine the reporting period based at least in part on a type of UE 120. For example, when the PRS reporting occasion periodicity is less than a threshold period, the reporting period determination may be determined as a non-linear function of PRS reporting occasion periodicity. In this case, for a first type of UE (e.g., a low-power UE), a first reporting period may be determined, and for a second type of UE (e.g., a non-low-power UE), a second reporting period may be determined. For example, a PRS reporting latency for PRS periodicities less than a threshold may be a constant, and a PRS reporting latency for PRS periodicities greater than or equal to a threshold may be a linear function of the PRS periodicity. In some aspects, a mobility measurement may be delayed based at least in part on a presence of a measurement gap. For example, UE 120 may determine to utilize the measurement gap for PRS measurement, and may delay the mobility measurement (e.g. intra or inter frequency neighbor cell measurement).

As indicated above, FIG. 9 is provided as an example. Other examples are possible and may differ from what was described with respect to FIG. 9.

Figure 10:
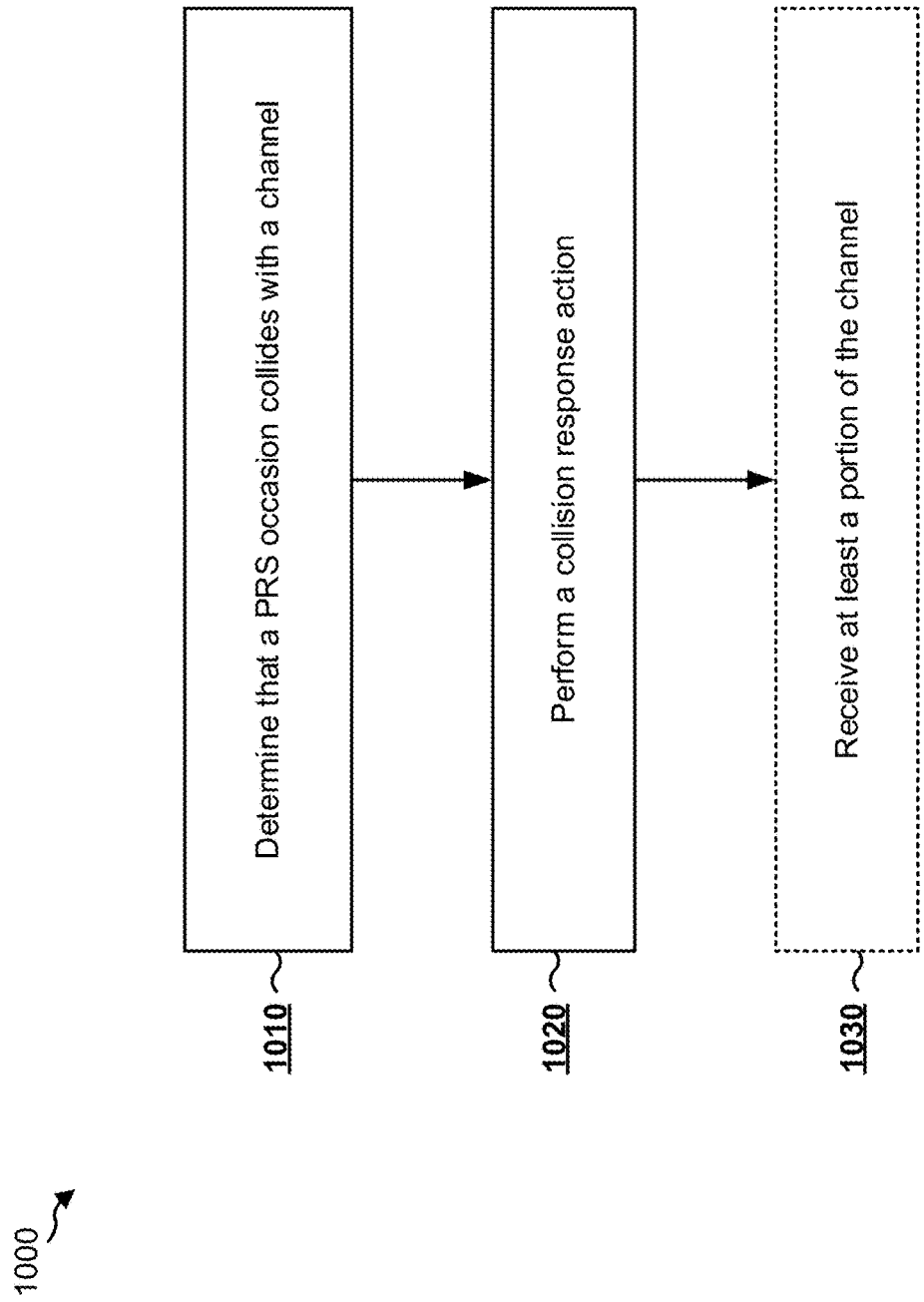
FIG. 10 is a flow chart of a method of wireless communication.

FIG. 10 is a flow chart of a method 1000 of wireless communication. The method may be performed by a UE (e.g., the UE 120, the apparatus 1102/1102', and/or the like).

At 1010, the UE may determine that a positioning reference signal (PRS) occasion collides with a channel. For example, the UE (e.g., using controller/processor 280 and/or the like) may determine that the channel overlaps with one or more PRS subframes, one or more warm-up subframes immediately preceding the one or more PRS subframes, one or more cool-down subframes immediately succeeding the one or more PRS subframes, and/or the like.

At 1020, the UE may perform a collision response action. For example, the UE (e.g., using controller/processor 280 and/or the like) may determine a collision response action, and may perform the collision response action based at least in part on determining that the PRS occasion collides with the channel.

At 1030, in some aspects, the UE may receive at least a portion of the channel. For example, the UE (e.g., using antenna 252, DEMOD 254, MIMO detector 256, receive processor 258, controller/processor 280, and/or the like) may receive a portion of the channel that is not dropped to enable the UE to receive and/or process a PRS of the PRS occasion.

Method 1000 may include additional aspects, such as any single aspect or any combination of aspects described below and/or in connection with one or more other processes described elsewhere herein.

In some aspects, the collision response action includes a mobility measurement scheduled for a measurement gap being delayed and a PRS measurement occurring during the measurement gap. In some aspects, the collision response action includes determining that the portion of the channel is punctured and dropping the portion of the channel.

In some aspects, the PRS occasion includes at least one subframe before a set of PRS subframes and at least one subframe after the set of PRS subframes. In some aspects, the UE may receive repetitions of the channel. For example, based at least in part on dropping a first set of repetitions of the channel that collide with the PRS occasion, the UE may receive a second set of repetitions of the channel that do not collide with the PRS occasion. In this case, the UE may decode the channel using the second set of repetitions.

In some aspects, the channel is associated with a machine type communication control channel search space and the collision response action includes dropping each candidate of the machine type communication control channel search space. In some aspects, the channel is associated with a machine type communication control channel search space and the collision response action includes dropping colliding candidates in the machine type communication control channel search space. In some aspects, the channel is a downlink shared channel and the collision response action includes dropping an entirety of the downlink shared channel. In some aspects, the channel is a downlink shared channel and the collision response action includes receiving a subset of repetitions of the downlink shared channel.

In some aspects, the channel is a physical channel and the physical channel is dropped based at least in part on a quantity of repetitions of the physical channel. In some aspects, the channel is an uplink channel and the collision response action includes dropping a colliding portion of the uplink channel. In some aspects, the colliding portion of the uplink channel is determined based at least in part on a guard subframe associated with the uplink channel. In some aspects, the PRS occasion includes one or more muted subframes. In some aspects, the collision response action is determined based at least in part on a presence of repetitions of the channel.

In some aspects, a reference signal time difference (RSTD) measurement reporting occasion is determined based at least in part on a periodicity of a PRS reporting occasion and a type of the user equipment. In some aspects, a mobility measurement is delayed based at least in part on a PRS measurement associated with the PRS occasion.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
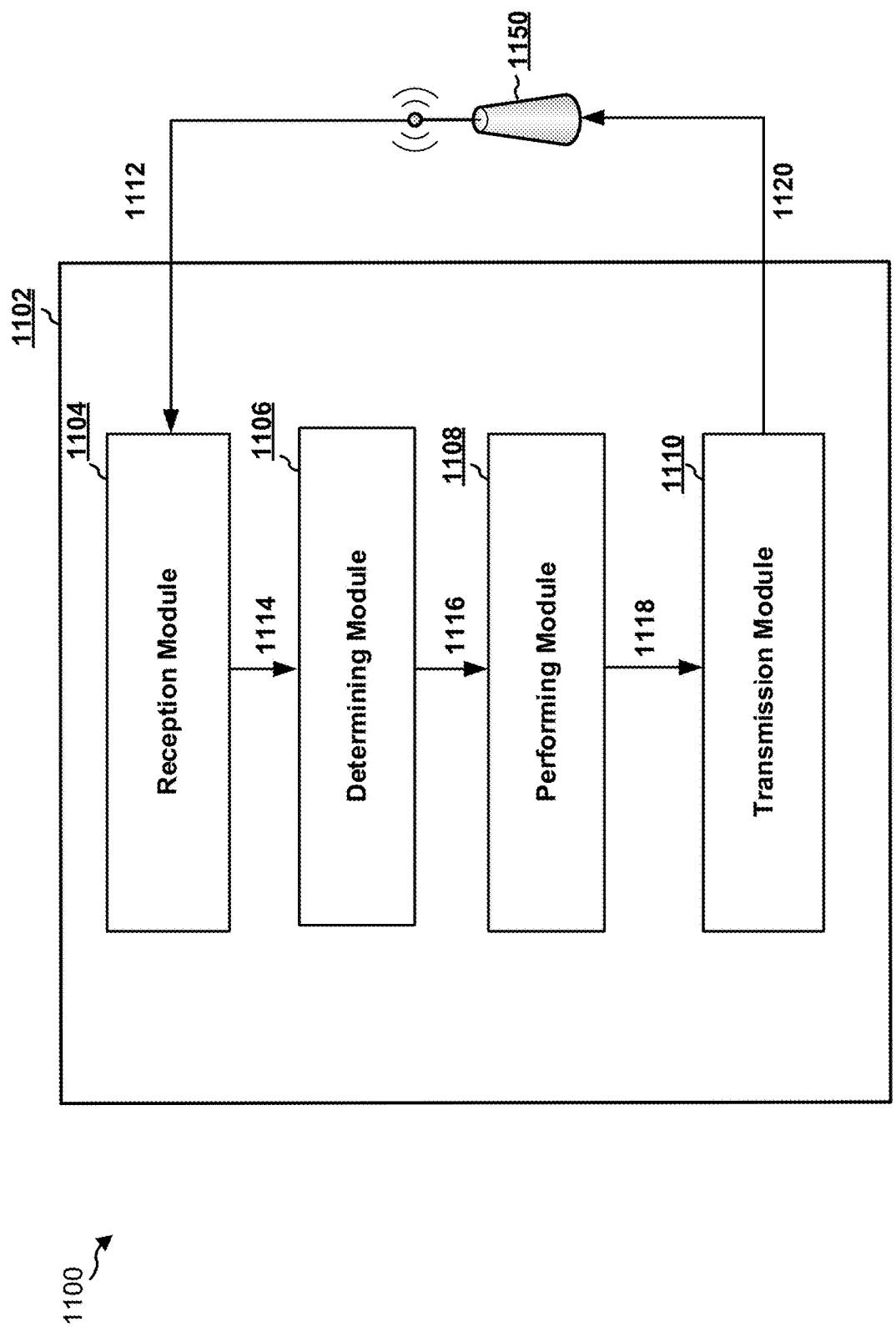
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a UE. In some aspects, the apparatus 1102 includes a reception module 1104, a determining module 1106, a performing module 1108, and/or a transmission module 1110.

The reception module 1104 may receive, from a base station 1150 and as data 1112, information associated with a channel, a PRS occasion, and/or the like. For example, the reception module 1104 may receive a PRS in one or more PRS subframes, a channel, and/or the like. In some aspects, the reception module may receive a portion of a channel. For example, based at least in part on the performing module 1108 causing a first portion of a channel that collides with a PRS occasion to be dropped, the reception module 1104 may receive a second portion of the channel that does not collide with the PRS occasion. In some aspects, the reception module 1104 may receive control information, such as scheduling information, identifying a schedule for a channel, a periodicity of a PRS, and/or the like. In some aspects, the reception module 1104 may receive information from the performing module 1108. For example, the reception module 1104 may receive information indicating whether to receive a channel, whether to drop a channel, and/or the like.

The determining module 1106 may receive, from the reception module 1104 and as data 1114, information associated with a schedule for a channel, a periodicity for a PRS occasion, and/or the like. For example, the determining module 1106 may receive scheduling information identifying a schedule for a channel, a periodicity of a PRS, and/or the like. In this case, the determining module 1106 may determine that the PRS and/or a warm-up or cool-down subframe contiguous to the PRS collides with a channel (e.g., a downlink channel, an uplink channel, a guard band associated with a transfer between uplink transmission and downlink reception, and/or the like).

The performing module 1108 may receive, from the determining module 1106 and as data 1116, information associated with determining a collision for a PRS occasion and a channel. For example, the performing module 1108 may receive information identifying a collision of a portion of a channel with a PRS occasion, and may select a response action. In this case, the performing module 1108 may perform the response action, such as by causing the reception module 1104 to drop the channel, drop the portion of the channel, prioritize PRS tones or resource blocks over the channel, and/or the like.

The transmission module 1110 may receive, from the performing module 1108 and as data 1118, information associated with transmitting a measurement report. For example, the transmission module 1110 may receive information identifying a periodicity for transmission of a reference signal time difference (RSTD) measurement, and may transmit the RSTD measurement based at least in part on the periodicity. In some aspects, the transmission module 1110 may receive information associated with dropping a portion of a channel. For example, the performing module 1108 may cause the transmission module 1110 to drop a portion of an uplink channel that collides with a PRS occasion. The transmission module 1110 may provide, to the base station 1150 and as data 1120, a measurement report, a channel, and/or the like.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
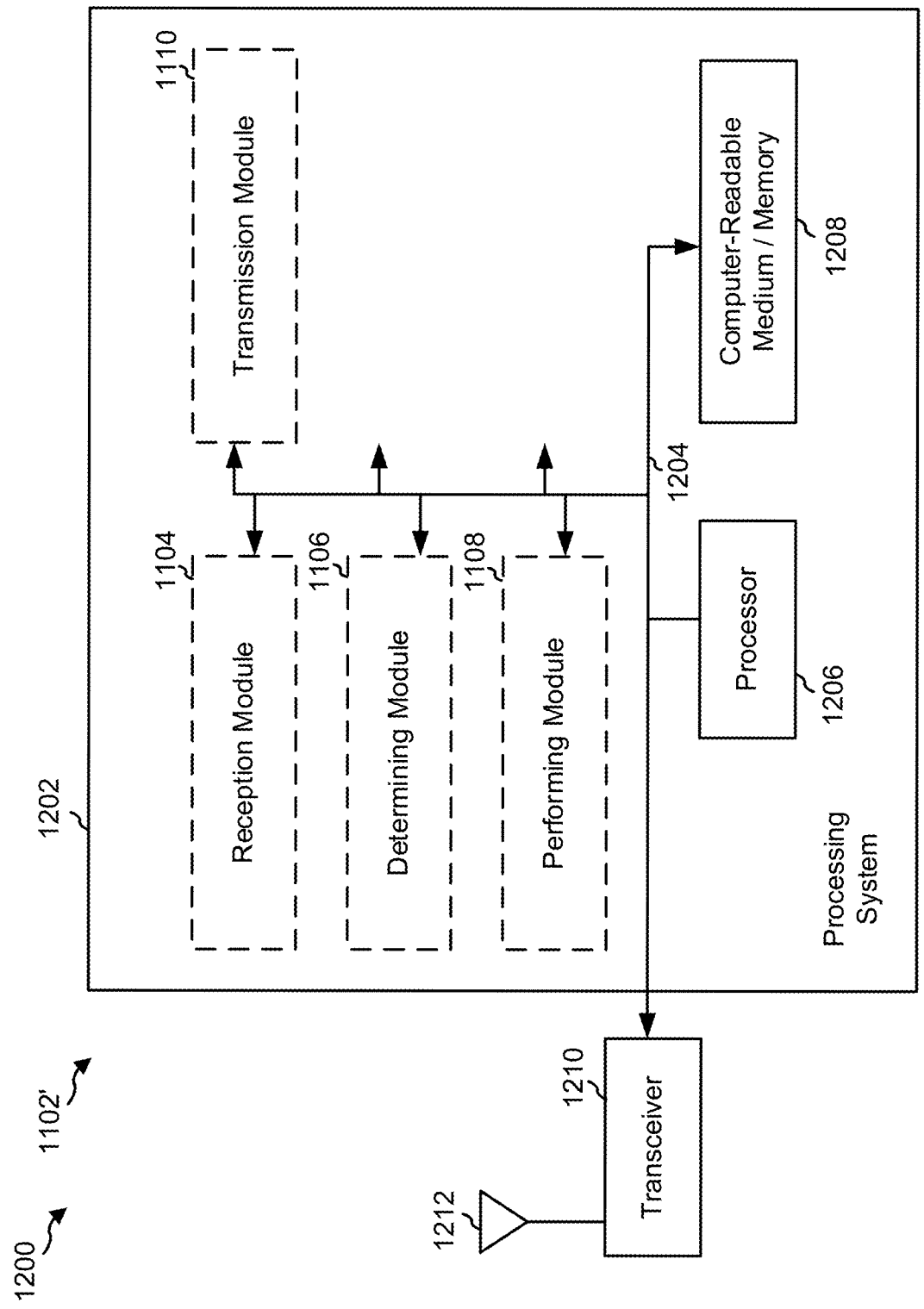
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a UE.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1110, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, 1108, and 1110. The modules may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for determining that a PRS occasion collides with a channel, and means for performing a collision response action based at least in part on determining that the PRS occasion collides with the channel. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
  determining, by a user equipment, that a positioning reference signal (PRS) occasion collides with a channel, wherein the channel is a physical downlink shared channel (PDSCH), and wherein the PRS occasion includes one or more muted subframes;
determining, by the user equipment, the channel as punctured based on a quantity of repetitions associated with the channel; and
performing, by the user equipment, a collision response action based at least in part on determining that the PRS occasion collides with the channel and based on determining the channel as punctured, wherein the collision response action includes dropping at least a portion of the channel.

2. The method of claim 1, wherein the channel is a physical channel and the physical channel is dropped based at least in part on a quantity of repetitions of the physical channel.

3. The method of claim 1, wherein the collision response action includes a mobility measurement scheduled for a measurement gap being delayed and a PRS measurement occurring during the measurement gap.

4. The method of claim 1, wherein the collision response action includes determining that the portion of the channel is punctured and dropping the portion of the channel.

5. The method of claim 1, wherein the PRS occasion includes at least one subframe before a set of PRS subframes and at least one subframe after the set of PRS subframes.

6. The method of claim 1, wherein the channel is associated with a machine type communication control channel search space and the collision response action includes dropping each candidate of the machine type communication control channel search space.

7. The method of claim 1, wherein the channel is associated with a machine type communication control channel search space and the collision response action includes dropping colliding candidates in the machine type communication control channel search space.

8. The method of claim 1, wherein the channel is a downlink shared channel and the collision response action includes dropping the entirety of the channel.

9. The method of claim 1, wherein the channel is a downlink shared channel and the collision response action includes receiving a subset of repetitions of the downlink shared channel.

10. The method of claim 1, wherein the channel is an uplink channel and the collision response action includes dropping a colliding portion of the uplink channel.

11. The method of claim 10, wherein the colliding portion of the uplink channel is determined based at least in part on a guard subframe associated with the uplink channel.

12. The method of claim 1, wherein the collision response action is determined based at least in part on a presence of repetitions of the channel.

13. The method of claim 1, wherein a reference signal time difference (RSTD) measurement reporting occasion is determined based at least in part on a periodicity of a PRS reporting occasion and a type of the user equipment.

14. The method of claim 1, wherein a mobility measurement is delayed based at least in part on a PRS measurement associated with the PRS occasion.

15. The method of claim 1, wherein a PRS is not transmitted from a base station in the one or more muted subframes, and wherein the one or more muted subframes are used to measure a PRS from another base station.

16. A user equipment for wireless communication, comprising:
memory; and
one or more processors coupled to the memory, the memory and the one or more processors configured to:
determine that a positioning reference signal (PRS) occasion collides with a channel, wherein the channel is a physical downlink shared channel (PDSCH), and wherein the PRS occasion includes one or more muted subframes;
determine the channel as punctured based on a quantity of repetitions associated with the channel; and
perform a collision response action based at least in part on determining that the PRS occasion collides with the channel and based on determining the channel as punctured, wherein the collision response action includes dropping at least a portion of the channel.

17. The user equipment of claim 16, wherein the channel is a physical channel and the physical channel is dropped based at least in part on a quantity of repetitions of the physical channel.

18. The user equipment of claim 16, wherein the collision response action includes a mobility measurement scheduled for a measurement gap being delayed and a PRS measurement occurring during the measurement gap.

19. The user equipment of claim 16, wherein the collision response action includes determining that the portion of the channel is punctured and dropping the portion of the channel.

20. The user equipment of claim 16, wherein the PRS occasion includes at least one subframe before a set of PRS subframes and at least one subframe after the set of PRS subframes.

21. The user equipment of claim 16, wherein the channel is associated with a machine type communication control channel search space and the collision response action includes dropping each candidate of the machine type communication control channel search space.

22. The user equipment of claim 16, wherein the channel is associated with a machine type communication control channel search space and the collision response action includes dropping colliding candidates in the machine type communication control channel search space.

23. The user equipment of claim 16, wherein the channel is a downlink shared channel and the collision response action includes dropping the entirety of the channel.

24. The user equipment of claim 16, wherein the channel is a downlink shared channel and the collision response action includes receiving a subset of repetitions of the downlink shared channel.

25. The user equipment of claim 16, wherein the channel is an uplink channel and the collision response action includes dropping a colliding portion of the uplink channel.

26. The user equipment of claim 25, wherein the colliding portion of the uplink channel is determined based at least in part on a guard subframe associated with the uplink channel.

27. The user equipment of claim 16, wherein the PRS occasion includes one or more muted subframes.

28. The user equipment of claim 16, wherein the collision response action is determined based at least in part on a presence of repetitions of the channel.

29. An apparatus for wireless communication, comprising:
means for determining that a positioning reference signal (PRS) occasion collides with a channel, wherein the channel is a physical downlink shared channel (PDSCH), and wherein the PRS occasion includes one or more muted subframes;
means for determining the channel as punctured based on a quantity of repetitions associated with the channel; and means for performing a collision response action based at least in part on determining that the PRS occasion collides with the channel and based on determining the channel as punctured, wherein the collision response action includes dropping at least a portion of the channel.

30. A non-transitory computer-readable medium storing instructions for wireless communication, the instructions comprising:
one or more instructions that, when executed by one or more processors of a user equipment, cause the one or more processors to:
determine that a positioning reference signal (PRS) occasion collides with a channel, wherein the channel is a physical downlink shared channel (PDSCH), and wherein the PRS occasion includes one or more muted subframes;
determine the channel as punctured based on a quantity of repetitions associated with the channel; and
perform a collision response action based at least in part on determining that the PRS occasion collides with the channel and based on determining of the channel as punctured, wherein the collision response action includes dropping at least a portion of the channel.

* * * * *